United States Patent
Cesnovar

(10) Patent No.: US 8,013,205 B2
(45) Date of Patent: Sep. 6, 2011

(54) METHOD FOR TREATING FLY ASH

(75) Inventor: Renata Cesnovar, Karlsruhe (DE)

(73) Assignee: Karlsruher Institut Fuer Technologies, Karlsruhe (DE)

( * ) Notice: Subject to any disclaimer, the term of this patent is extended or adjusted under 35 U.S.C. 154(b) by 0 days.

(21) Appl. No.: 12/812,400

(22) PCT Filed: Dec. 20, 2008

(86) PCT No.: PCT/EP2008/010977
§ 371 (c)(1),
(2), (4) Date: Jul. 9, 2010

(87) PCT Pub. No.: WO2009/089896
PCT Pub. Date: Jul. 23, 2009

(65) Prior Publication Data
US 2010/0284874 A1 Nov. 11, 2010

(30) Foreign Application Priority Data
Jan. 17, 2008 (DE) .......................... 10 2008 004 796

(51) Int. Cl.
*A62D 3/30* (2007.01)
*A62D 3/37* (2007.01)

(52) U.S. Cl. ...................................... 588/404; 423/215.5

(58) Field of Classification Search .................. 588/404; 423/215.5
See application file for complete search history.

(56) References Cited

U.S. PATENT DOCUMENTS

| | | |
|---|---|---|
| 4,607,021 A | 8/1986 | Corbin et al. |
| 4,649,031 A | 3/1987 | Matyas et al. |

FOREIGN PATENT DOCUMENTS

| | | | |
|---|---|---|---|
| JP | 11-47713 A | * | 2/1999 |
| JP | 2002-210436 A | * | 7/2002 |
| JP | 2003-88834 A | * | 3/2003 |
| JP | 2003-94000 A | * | 4/2003 |
| WO | WO 8904811 A1 | | 6/1989 |

OTHER PUBLICATIONS

Hallgren et al., Current Methods to Detoxify Fly Ash from Waste Incineration; Report No. TPS 2004:1 Svensk Fjarrvarme AB, 2004, ISSN 14025191.
International Preliminary Report on Patentability for PCT/EP2008/010977 mailed on Jul. 29, 2010.
International Search Report for PCT/EP2008/010977 mailed on Aug. 18, 2009.

* cited by examiner

*Primary Examiner* — Timothy C Vanoy
(74) *Attorney, Agent, or Firm* — Leydig, Voit & Mayer, Ltd.

(57) ABSTRACT

A method for treating fly ash from incineration plants having at least one combustion chamber includes precipitating fly ash in a dust separator, and treating the fly ash using a gaseous reducing agent at a temperature between 600 and 700° C. so as to selectively convert a metal sulfate into at least one of a sulfide and a metallic form of the metal sulfate.

8 Claims, 4 Drawing Sheets

METHOD FOR TREATING FLY ASH

CROSS-REFERENCE TO PRIOR APPLICATIONS

This applications is a U.S. National Phase application under 35 U.S.C. §371 of International Application No. PCT/EP2008/010977, filed on Dec. 20, 2008 and claims benefit to German Patent Application No. DE 10 2008 004 796.1, filed on Jan. 17, 2008. The International Application was published in German on Jul. 23, 2009 as WO 2009/089896 A2 under PCT Article 21(2).

FIELD

The present invention relates to a method for treating, in particular for inertizing fly ash from incineration plants.

BACKGROUND

Upon combustion of inhomogeneous or contaminated fuels, in particular, such as household refuse, flue gases are formed, which, besides the main combustion products of carbon dioxide and water, to an increasing degree of contamination, also contain numerous contaminants, such as dust, acidic gases, heavy metals and organic substances, for example. In this context, it is known that many of these groups of contaminants, in particular, however, the heavy metals released during combustion, become concentrated in the fly ash.

In the course of a waste-gas purification, the fly ash, together with a multiplicity of the contaminants bound into the same, are separated out as filter ash or filter dust by dust separators immediately following the combustion and flue gas cooling. At present, filter ash or filter dust from waste incineration plants is dumped in underground landfills since it is not suited for an open landfilling (for example, in accordance with waste class II, TA household waste) due, inter alia, to the high concentration of water-soluble metal compounds. Therefore, for an open landfilling, it is desirable that the fly ash be rendered harmless prior to a landfilling of this kind.

Christine Hallgren, Birgitta Strömberg: Current Methods to Detoxify Fly Ash from Waste Incineration; Report no. TPS 2004:1 Svensk Fjärrvärme AB, 2004, ISSN 1402-5191, describes currently available technologies for treating filter ash from waste incineration plants that have already been tested in the industry or are operated as pilot plants. In this respect, the following methods for separating heavy metals from fly ash are known:

What is generally referred to as the CT-Fluapur process is a thermal process in which the filtered-out heavy metal-containing fly ash is introduced as filter ash into a hydrochloric acid atmosphere at 900° C. In the hydrochloric acid atmosphere that is present, heavy metals or compounds are converted into volatile metal chlorides. In this context, these heavy metal chlorides partially evaporate, the heavy metal content in the remaining fly ash to be landfilled thereby decreasing. The released gaseous metal chlorides then react with water vapor, forming solid metal oxides, and can subsequently be separated off from the gas stream.

The Christine Hallgren et al. report referenced above also discusses a wet chemical method that utilizes what is generally known as the 3R process. It provides for an acidic extraction of heavy metals from filter dust; after approximately 15 minutes reaction time in an acid atmosphere (pH value approximately 1), up to 89% cadmium, 68% zinc, 18% copper and 22% lead being extracted from the filter dust. The remaining solid residues of the filter dust are subsequently solidified together with a binding agent and returned again to the combustion process to destroy the organic contaminants (for example, PCDD, PCDF) bound into the same. The extracted heavy metals may be separated out from the aqueous solution and fed to a recycling.

The Christine Hallgren et al. report likewise discusses what is generally referred to as the MR process. It provides in a first step for an alkaline extraction, in particular of sulfates (for, example, K, Na) at pH values of between 9 and 12. This is followed by an acidic extraction using hydrochloric acid to dissolve heavy metals, a separation of residue and dissolved heavy metals, as well as a liberation of residues from salts by washing with water. The remaining filter ash is subsequently heated in a rotary furnace for about one hour at a temperature of over 600° C. to destroy organic contaminants such as PCDD and PCDF.

To date, cost considerations have precluded an industrial scale use of all of the mentioned methods and, instead, direct underground disposal (i.e., without additional treatment) has been favored.

SUMMARY

An aspect of the present invention is to provide a method that is simple and, thus, economical on a large scale, for inertizing or separating off heavy metals from a fly ash. It is an additional, alternative aspect that the products produced by the method are safely landfillable, and preferably also recyclable as raw material for a further use.

In an embodiment, the present invention provides a method for treating fly ash from incineration plants having at least one combustion chamber. The method includes precipitating fly ash in a dust separator, and treating the fly ash using a gaseous reducing agent at a temperature between 600 and 700° C. so as to selectively convert a metal sulfate into at least one of a sulfide and a metallic form of the metal sulfate.

BRIEF DESCRIPTION OF THE DRAWINGS

The present invention is explained in greater detail in the following with reference to exemplary embodiments and exemplary experiments, as well as with reference to the figures, which show.

DETAILED DESCRIPTION

Figure 1A:
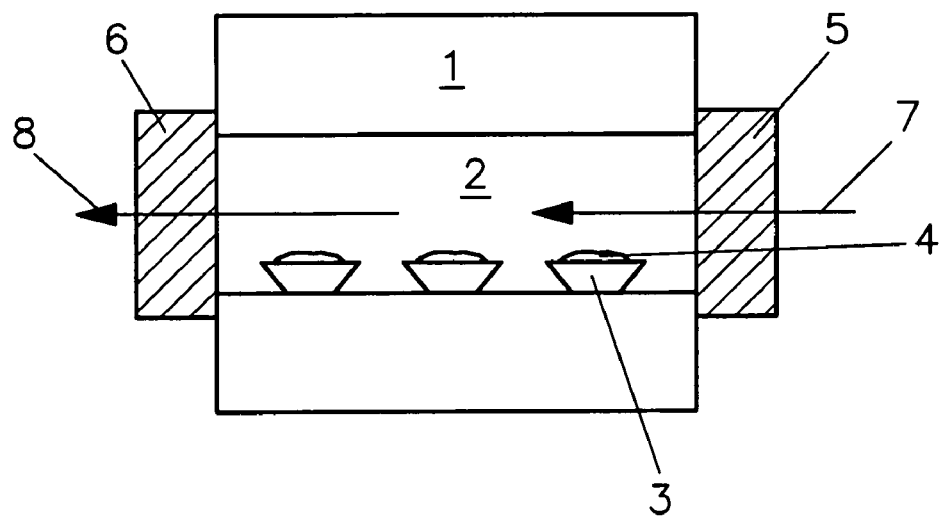
FIG. 1a is a schematic illustration of a laboratory installation for implementing a method of thermal treatment of fly ash according to one embodiment of the present invention.

In a method according to one embodiment of the present invention, metals are separated off from a fly ash from incineration plants having at least one combustion chamber. In a first step, the fly ash is precipitated from the waste gas, preferably in a dust separator downstream of the afterburner chamber or steam generator. Subsequently thereto, the precipitated fly ash is fed to a separate treatment away from the waste gas stream, where the heavy metal compounds in water-soluble form are converted into water-insoluble modifications. The separate treatment is preferably carried out continuously, the fly ash being transported through a heated furnace chamber or in heated rotary drums. Alternatively, however, a batch process using individual fly ash batches is also suitable. The aim of the treatment is to selectively convert specific substances, such as water-soluble heavy metal compounds, for example, into a landfillable, insoluble solid form, preferably in an elemental form or sulfides. While elemental heavy metals are particularly suited for recycling, the water-insoluble sulfides are very advantageously landfillable on a long-term, continuous basis, even in a moist atmosphere, due to their stability in storage together with the remaining fly ash.

The method according to one embodiment of the present invention encompasses a treatment of the fly ash using a gaseous reducing agent in the temperature range of between 550 and 900° C., preferably 580 to 800° C., more preferably of between 600 and 700° C. At these temperatures, other contaminants, such as polychlorinated dioxins and furans, also decompose and, therefore, no longer occur in the fly ash. Particularly suited as a gaseous reducing agent is carbon monoxide or hydrogen, which is preferably fed to the reaction as a continuous gas stream in the aforementioned temperature intervals. Within this temperature window, metal sulfates are advantageously selectively converted into their metallic form or into sulfides, while the method is also distinguished in that other sulfates or chlorides (for example, alkali chlorides) completely or mostly outlast the thermal treatment, in particular temperatures below 800° C. The preferred reaction time in the aforementioned temperature intervals is between 15 and 180 min, more preferably between 20 and 100 min. It is also a function of the reaction temperature; in principle, in the aforementioned temperature intervals, higher temperatures permitting shorter reaction times.

Lead sulfates are selectively converted into their metallic form or into sulfides exemplarily, but without limitation to the Pb lead system, in accordance with the following reactions:

$$PbSO_4 + 2CO \rightarrow Pb + SO_2\uparrow + 2CO_2\uparrow \quad (1)$$

and/or

$$PbSO_4 + 4CO \rightarrow PbS + 4CO_2\uparrow. \quad (2)$$

In the method according to one embodiment of the present invention, sulfates of other metals, in particular, iron Fe, copper Cu or zinc Zn are converted to their metallic form or to sulfides in a chemically analogous manner.

The method is especially effective for a fly ash having a high degree of sulfation (sulfur to chlorine ratio>>1).

A separation of the remaining water-soluble compounds, such as alkali sulfates and alkali chlorides, by extraction using water and subsequent solid-liquid separation and drying, serves to further concentrate the insoluble elemental metals or metal sulfides. Therefore, one advantageously obtains a substance that is dry, water-insoluble and thus features very good storability, in which the total heavy metal content of the fly ash is contained in concentrated form.

Figure 1B:
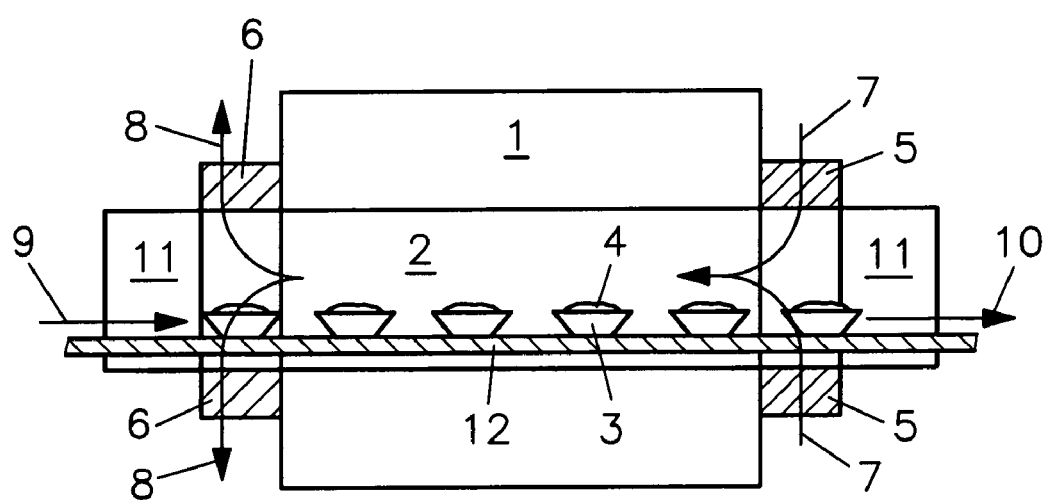
FIG. 1b is a schematic illustration of a laboratory installation for implementing a method of thermal treatment of fly ash according to another embodiment of the present invention.

A laboratory experiment for implementing the method step of the treatment of the fly ash using a gaseous reducing agent in the preferred temperature range of between 600 and 700° C., metal sulfates being selectively converted to their metallic form or into sulfides, is shown in FIGS. 1a and 1b. In each case, they encompass a tunnel furnace 1, through whose furnace chamber 2, corundum boat 3 containing fly ash 4 to be treated is transported. The furnace chamber itself is bounded on one side by a flow meter 5 and, on the other side, by a gas filter 6 for introducing 7, respectively, withdrawing 8 the gaseous reducing agent.

FIG. 1b depicts one possible specific embodiment of the device for a continuous treatment of fly ash where flow meter 5 and gas filter 6 are configured around the furnace chamber openings and, in this configuration, a charging 9 and discharging 10 of corundum boats 3 through two lock regions 11 are made possible in the course of operation. In the exemplary embodiment, flow meter 5 and gas filter 6, as annular components, form an extension of furnace chamber 2 and thus assume the function of the temperature transition regions on both sides of the furnace chamber and thus advantageously shift the same into a region outside of the furnace chamber. The feed motion of the boats through the furnace chamber is preferably executed counter to the flow of reducing agent via a conveyor 12, such as a belt or bar-type conveyor, for example. Lock regions 11 each include one lock, preferably having a lock chamber and two lock gates, and thereby prevent reducing agent from continuously escaping.

Following the treatment of the fly ash using a gaseous reducing agent, an elution of the reduced filter ash is preferably carried out in moving water. In the process, the remaining water-soluble compounds, such as alkali sulfates and alkali chlorides, are separated in the water, and a subsequent solid-liquid separation follows.

The method for separating metals from a fly ash from incineration plants having at least one combustion chamber is explained in the following with reference to one exemplary experiment.

Example

From a continuous waste incineration process, fly ash is initially precipitated in a hot gas filter immediately downstream of the afterburner chamber. The fly ash is filled into the aforementioned corundum boats for further processing and introduced into a tunnel furnace. As previously described, a transfer to a continuous processing during an ongoing operation is effected merely by a reconfiguration of the tunnel furnace in accordance with FIG. 1b.

The fly ash was precipitated in the test installation TAMARA of Forschungszentrum Karlsruhe. The following treatment was carried out in a batchwise process in the context of a test optimization; in each case, three corundum boats containing filter ash samples being introduced into a reaction pipe, and being exposed therein to a carbon monoxide stream as a reducing agent stream. In the context of the test optimization, the inside of the reaction pipe, introduced into the tunnel furnace, forms the furnace chamber. The carbon monoxide stream was approximately 50 ml/min and was adjusted and controlled by a flow meter (firm Aalborg Instruments & Controls, Inc., U.S.).

The reducing treatment in the tunnel furnace was carried out at 600° C., the reaction pipe being rinsed with an inert gas (for example, Ar, N) to avoid unwanted oxidation of fly ash prior to introduction of the ash samples. Approximately 10 g of filter ash were subsequently weighed into each corundum boat and introduced into the middle of the reaction pipe. The residence time lasted three hours in the presence of a carbon monoxide flow of approximately 50 ml/min.

For a subsequent analysis, 5 g of the reduced fly ash was suspended in 50 ml of water and agitated with the same for 24 hours. Subsequently thereto, the fly ash constituents that had not dissolved were filtrated and subsequently dried at 40° C. The heavy metal concentration in the solution that was filtered out is a measure of the quality of the elution stability of residues, and it characterizes the suitability for landfilling.

Figure 2A:
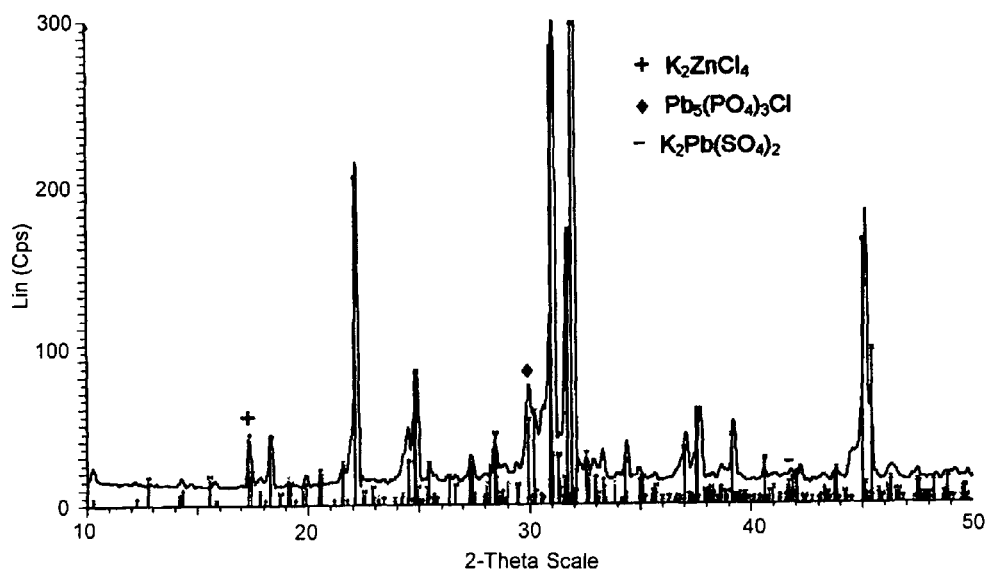
FIG. 2a shows the phase composition of unreduced filter ash.

The composition of the fly ash is able to be determined by x-ray absorption fine-structure analysis using a diffractometer:

Untreated fly ash is initially composed of a mixture of potassium sodium sulfate ($KNaSO_4$), thenardite ($Na_2SO_4$), halite (NaCl), sylvite (KCl), quartz ($SiO_2$), anhydrite ($CaSO_4$), haematite ($Fe_2O_3$), magnetite ($Fe_3O_4$), rutile ($TiO_2$) and, as heavy metal sources, dipotassium tetrachlorozincate ($K_2ZnCl_4$), pyromorphite ($Pb_5(PO_4)_3Cl$) and palmierite ($K_2Pb(SO_4)_2$) (see FIG. 2a).

Figure 2B:
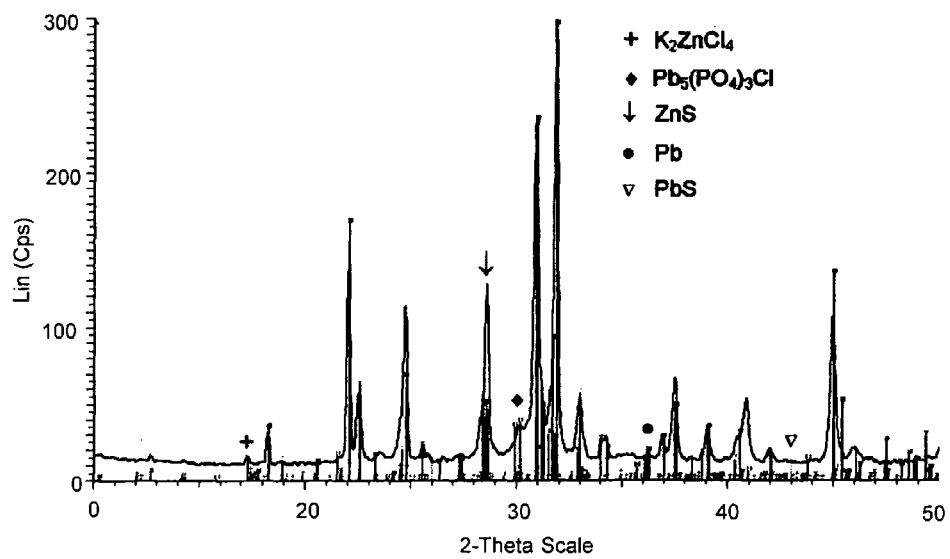
FIG. 2b shows the phase composition of reduced filter ash.

The phase composition of the filter ash following the reduction (FIG. 2b) shows that, besides alkali sulfates and alkali chlorides that have not been reduced, heavy metal phases galenite (PbS), metallic lead (Pb) and sphalerite (ZnS) are present. On the basis of very weak intensity reflexes, traces of dipotassium tetrachlorozincate ($K_2ZnCl_4$), pyromorphite ($Pb_5(PO_4)_3Cl$) and willemite ($Zn_2SiO_4$) were identified.

Figure 3:
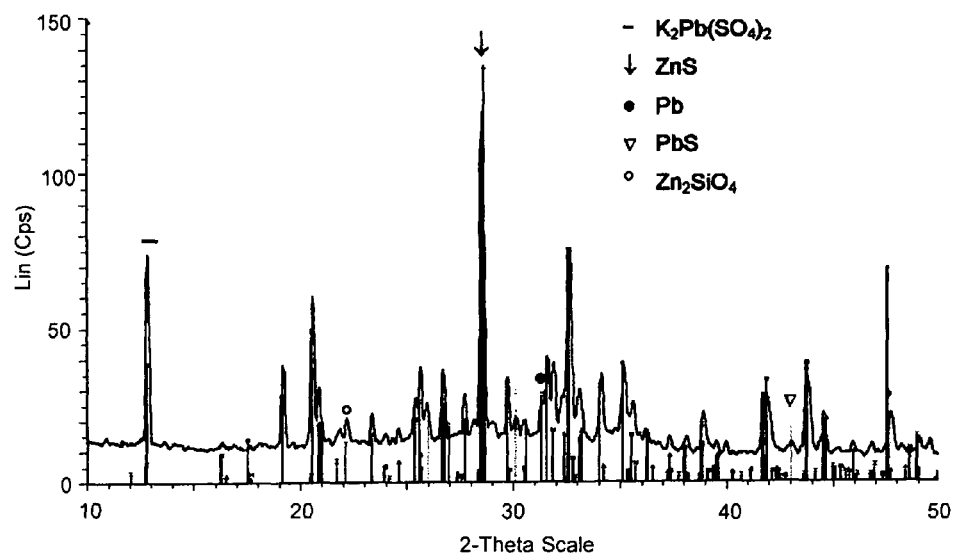
FIG. 3 shows the phase composition of the isolated, water-insoluble fraction of the reduced filter ash in accordance with FIG. 2b.

The aforementioned water-insoluble fly ash constituents that have been filtered out of the reduced fly ash and dried at 40° C. are composed of a mixture of sphalerite (ZnS), lead (Pb), lead sulfide (PbS), willemite ($Zn_2SiO_4$) and palmierite ($K_2Pb(SO_4)_2$) as a heavy metal source and quartz ($SiO_2$), anhydrite ($CaSO_4$), magnetite ($Fe_3O_4$) and traces of alkali sulfates and alkali chlorides (see FIG. 3).

Figure 4:
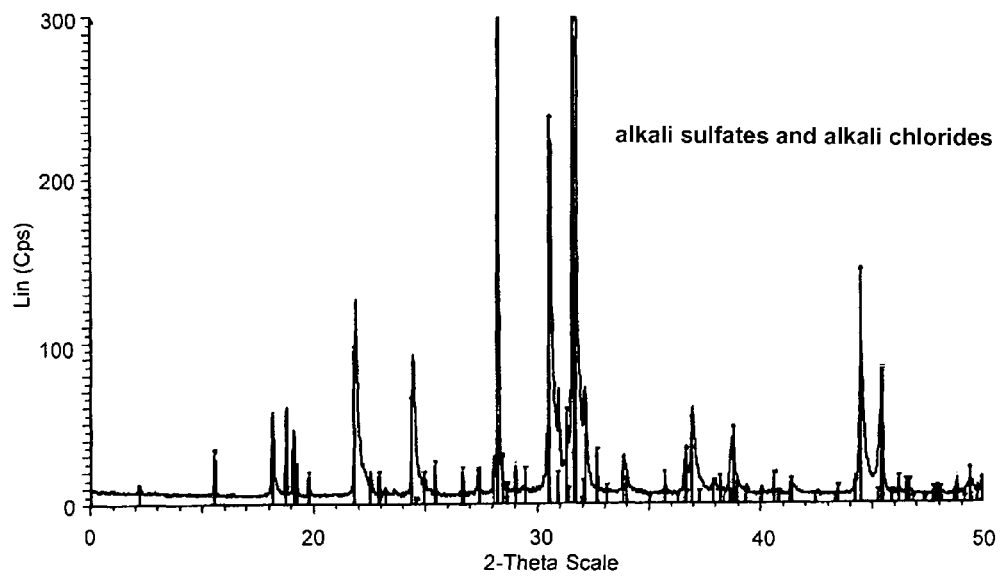
FIG. 4 shows the phase composition of the isolated, water-soluble fraction of the reduced filter ash in accordance with FIG. 2b.

On the other hand, the water-soluble fraction of the reduced fly ash is only composed of alkali sulfates and alkali chlorides, while heavy metal-containing phases are not detectable (see FIG. 4).

In addition, raster electron-microscope photographs (not shown) (in the REM) of the treated, i.e., reduced fly ash make it possible to detect that the heavy metals become greatly enriched during the treatment on the outer grain boundaries of the fly ash, and that the grain size thereof increases substantially during the thermal treatment. Phases of this kind form the water-insoluble constituents and thus the harmless, landfillable fractions of the fly ash that are stable in storage over the long term. They may also be fed to a material recycling, for example, to recover metal.

A chemical analysis of the water-insoluble fractions of the reduced fly ash confirms that the heavy metals to be precipitated are concentrated in the water-insoluble solid residue that only makes up 25% by weight of the total reduced fly ash. The remaining 75% by weight of the fly ash is composed of heavy metal-free water-soluble fractions. The proportions and composition of the insoluble fraction, respectively of the soluble fraction are compiled in Table 1.

Through application of the method, the readily water-soluble heavy metal compounds contained in the filter ash were able to be reduced to their metallic form, respectively to sulfides. In this specification, the heavy metals/heavy metal compounds obtained are virtually insoluble in water. In this context, the grain size of the ash particles increases significantly, and the heavy metals are greatly enriched on the outer grain boundaries of the filter ash.

TABLE 1

Chemical composition of the reduced filter ash following elution (specifications given in % by weight).

|        | Insoluble Fraction | Soluble Fraction |
|--------|--------------------|------------------|
| $SO_4$ | 18                 | 48               |
| Si     | 14                 | —                |
| K      | 15                 | 26               |
| Ca     | 12                 | —                |
| Na     | 3                  | 18               |
| Cl     | 1                  | 7                |
| Pb     | 15                 | —                |
| Zn     | 13                 | —                |
| Fe     | 6                  | —                |
| Cu     | 1.5                | —                |
| Cr     | 1.4                | —                |

Figure 5A:
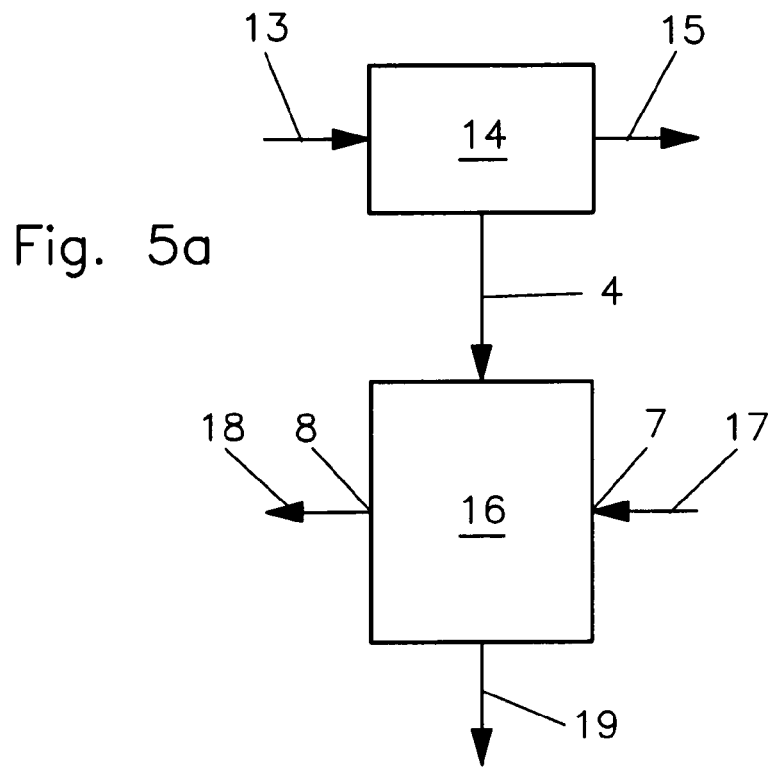
FIG. 5a is a block diagram for implementing, on an industrial scale, a method according to one embodiment of the present invention.
Figure 5B:
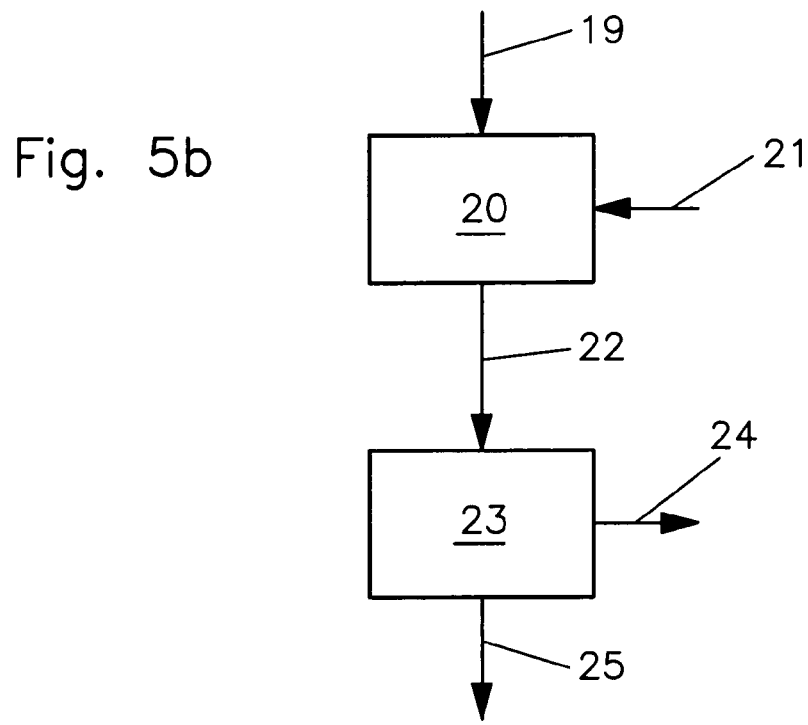
FIG. 5b is a block diagram for implementing, on an industrial scale, a method according to one embodiment of the present invention.

FIGS. 5a and 5b each represent schematic flow charts of an implementation of the method on an industrial scale. Raw gas 13 laden with fly ash is directed into a dust separator 14 and exits the same as purified clean gas 15. The precipitated fly ash 4 is then fed continuously or by portions to a furnace 16 (see FIG. 5a). The furnace is preferably composed of a rotary furnace or of a furnace having a spiral conveyor. A reducing atmosphere prevails therein that is able to be realized by a reducing agent inflow 17 that flows through the entire furnace chamber and exits the same again by way of a reducing agent outflow 18, in the same way as an inertized fly ash mass flow 18. If the reducing agent is carbon monoxide CO, then it may be returned to the combustion after passing through the furnace chamber.

For further treatment, the inertized fly ash mass flow 19 is feedable to an extraction of heavy metals (see FIG. 5b). To that end, it is first mixed with water 21 or a different solvent (for example, in an agitator vessel 20), the soluble components, for example, salts, dissolving in the solvent, and the insoluble components of the fly ash, for example, sulfides, becoming suspended. Water and fly ash exit agitator vessel 20 as solution suspension 22 and are fed in this form to a solid-liquid separation 23 (for example, filter, solid separator, centrifuge, membrane arrangement, etc.). Two material streams, an aqueous solution 24 containing the soluble constituents of the inertized fly ash (for example, salts, sulfates and chlorides), as well as a landfillable concentrate 25, exclusively of water-insoluble constituents of the inertized fly ash, such as metals or sulfites, for example, then exit solid-liquid separation 23.

While the invention has been described with reference to particular embodiments thereof, it will be understood by those having ordinary skill in the art that various changes may be made therein without departing from the scope and spirit of the invention. Further, the present invention is not limited to the embodiments described herein; reference should be made to the appended claims.

LIST OF REFERENCE NUMERALS 1 tunnel furnace
2 furnace chamber
3 corundum boat
4 fly ash
5 flow meter
6 gas filter
7 introduction
8 withdrawal
9 charging
10 discharging
11 lock region 12 conveyor
13 raw gas
14 dust separator
15 clean gas
16 furnace
17 reducing agent inflow
18 reducing agent outflow
19 inertized fly ash mass flow
20 agitator vessel
21 water
22 solution suspension
23 solid-liquid separation
24 aqueous solution
25 landfillable concentrate

The invention claimed is:

1. A method for treating fly ash from incineration plants having at least one combustion chamber, the method comprising:
   precipitating fly ash in a dust separator;
   treating the fly ash using a gaseous reducing agent at a temperature between 600 and 700° C. so as to selectively convert a metal sulfate into at least one of a sulfide and a metallic form of the metal sulfate.

2. The method as recited in claim 1, further comprising, after the treating the fly ash, separating a remaining water-soluble compound through extraction by using water and a subsequent solid-liquid separation.

3. The method as recited in claim 2, wherein the gaseous reducing agent includes carbon monoxide.

4. The method as recited in claim 2, wherein the gaseous reducing agent includes hydrogen.

5. The method as recited in claim 2, further comprising feeding the treated fly ash to a landfill.

6. The method as recited in, claim 1, wherein the gaseous reducing agent includes carbon monoxide.

7. The method as recited in claim 1, wherein the gaseous reducing agent includes hydrogen.

8. The method as recited in claim 1, wherein treating the fly ash produces a landfillable concentrate.

* * * * *